United States Patent
de Lind van Wijngaarden

(10) Patent No.: US 8,369,705 B2
(45) Date of Patent: Feb. 5, 2013

(54) SYSTEM AND METHOD FOR CHANNEL-ADAPTIVE ERROR-RESILIENT TRANSMISSION TO MULTIPLE TRANSCEIVERS

(75) Inventor: Adriaan J. de Lind van Wijngaarden, New Providence, NJ (US)

(73) Assignee: Alcatel Lucent, Paris (FR)

( * ) Notice: Subject to any disclaimer, the term of this patent is extended or adjusted under 35 U.S.C. 154(b) by 508 days.

(21) Appl. No.: 12/482,444

(22) Filed: Jun. 10, 2009

(65) Prior Publication Data

US 2010/0316380 A1 Dec. 16, 2010

(51) Int. Cl.
*H04J 14/00* (2006.01)
(52) U.S. Cl. .................... 398/70; 398/71; 398/72
(58) Field of Classification Search .......... 398/58–72
See application file for complete search history.

(56) References Cited

U.S. PATENT DOCUMENTS

| | | | |
|---|---|---|---|
| 6,477,669 B1 | 11/2002 | Anil et al. | |
| 6,487,686 B1 * | 11/2002 | Yamazaki et al. | 714/703 |
| 2005/0149822 A1 | 7/2005 | Hoon et al. | |
| 2006/0072926 A1 * | 4/2006 | Fukumitsu | 398/202 |
| 2008/0002977 A1 * | 1/2008 | Mori | 398/71 |
| 2008/0317467 A1 * | 12/2008 | Villarruel et al. | 398/68 |
| 2010/0098413 A1 * | 4/2010 | Li et al. | 398/38 |

FOREIGN PATENT DOCUMENTS

| | | |
|---|---|---|
| WO | WO9736377 | 10/1997 |
| WO | WO2004056025 A2 | 7/2004 |
| WO | WO2009020529 A2 | 2/2009 |

* cited by examiner

*Primary Examiner* — M. Reza Sedighian
(74) *Attorney, Agent, or Firm* — RG & Associates

(57) ABSTRACT

In a passive optical network, a downstream transmission rate from an OLT to multiple ONTs can be optimized by matching a transmission scheme for frames addressed to a channel to the downstream transmission characteristics of the channel. An FEC coding can be made channel dependent so that channels with low error rates can use minimal protection, and therefore minimal overhead, while channels with high input bit error rates can use the level of FEC coding required to produce a desired output bit error rate.

3 Claims, 3 Drawing Sheets

SYSTEM AND METHOD FOR CHANNEL-ADAPTIVE ERROR-RESILIENT TRANSMISSION TO MULTIPLE TRANSCEIVERS

FIELD OF THE INVENTION

This disclosure relates to passive optical networks and in particular to error resilient methods for providing downstream transmissions.

BACKGROUND OF THE INVENTION

Many access networks, in particular passive optical networks (PONs), provide a range of broadband and narrowband services using two-way communications between an access node (AN) and network terminals (NTs). PON is a widely used network architecture for residential and business broadband access. PONs are considered to be inexpensive for network operators because they do not require any active equipment or power supplies between the operator's central office (CO) and customer's premises (CP). In a typical PON an optical line termination (OLT) device provides downstream communications to multiple NTs, termed optical network units (ONU)s or optical network termination (ONT) devices. Typically, the downstream frames sent contain information for multiple NTs.

In the ITU-T and IEEE standards, such as ITU-T recommendation G.984.3, "Gigabit-capable Passive Optical Networks (GPON)": Transmission convergence layer specification, March 2008 and IEEE P802.3av-D3.3, "Physical layer specifications and management parameters for 10 Gb/s passive optical networks", IEEE 802.3 amendment, May 12, 2009, both of which are incorporated herein in their entirety by reference, the downstream is either not protected or a forward error correction (FEC) code may be used. Forward error correction (FEC) is often used in communication systems, and is based on transmitting the data in an encoded format. The encoding introduces redundancy, which allows the decoder to detect and correct transmission errors.

Typically, a systematic code such as a Reed Solomon (RS) code is used. A systematic code is a code where the part that carries the information is not transformed. The check symbols are computed and appended. If one does not use a decoder, it is sufficient to drop the check symbols. No other operation is required to be performed to retrieve the data (this is unlike, for instance, many convolutional codes), which is seen as one of the advantages of using systematic codes. Another advantage is the burst error correcting capability. Since the code corrects "symbols" of m bits each, if multiple consecutive bits are highly likely to be in error (a burst error), then it "counts" as only a few symbol errors.

The main motivation for using the FEC is the ability to operate at a lower signal to noise ratio (SNR) and its associated (higher) input bit error rate (BERi) while maintaining a low output bit error rate (BERo). For example, the (255,239) RS code described above provides a BERo below $10^{-15}$ for a BERi up to $10^{-4}$. This translates to an increase of the link budget of approximately 3-4 dB, and a reduction in data rate of approximately 7% when compared to no FEC. It should be noted that the OLT can disable the FEC, in which case the frames are sent without FEC protection.

The links between the OLT and the different ONUs typically have different SNRs and corresponding different BERis. If the link between the OLT and an ONU is good such that the BERi is already low, strong FEC is undesirable, because such FEC would require redundancy levels that reduce the transmission rate. At the same time, for a link between the OLT and an ONU that has a low SNR and a correspondingly high BERi, the standard level of FEC may not be sufficient to provide an acceptable BERo. As such, for a system with an OLT and multiple ONUs, the performance in terms of downstream transmission rate for a specified maximum BERo is determined by the worst OLT-ONU link.

Thus, what is required is a system and method for providing improved transmissions from an OLT to ONUs in a PON network.

SUMMARY OF THE INVENTION

In one aspect of the disclosure, there is provided a method for performing communications in a passive optical network comprising at least one optical line termination device and a plurality of optical network units downstream of the at least one optical line termination device. The method comprises determining downstream transmission characteristics for channels between the at least one optical line termination device and the plurality of optical network units, configuring a plurality of transmission schemes for a plurality of the channels, each transmission scheme being dependent on the downstream transmission characteristics of the respective channel, and performing downstream transmissions from the at least one optical line termination device on the plurality of channels, wherein a frame addressed to one of the plurality of channels is transmitted in accordance with the transmission scheme of the respective channel.

In one aspect of the disclosure, there is provided an optical network unit for a passive optical network, the optical network unit configured to receive one or more frames from an optical line termination device, apply a forward error correction code scheme to the one or more frames, count the number of errors corrected by the forward error correction code scheme, and report the number of errors to the optical line termination device.

In one aspect of the disclosure, there is provided an optical line termination device for a passive optical network, the optical line termination device configured to determine downstream transmission characteristics for channels between the optical line termination device and a plurality of optical network units, configure a plurality of transmission schemes for a plurality of the channels, each transmission scheme being dependent on the downstream transmission characteristics of the respective channel, and transmit one or more frames addressed to one of the plurality of channels in accordance with the transmission scheme for the respective channel.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
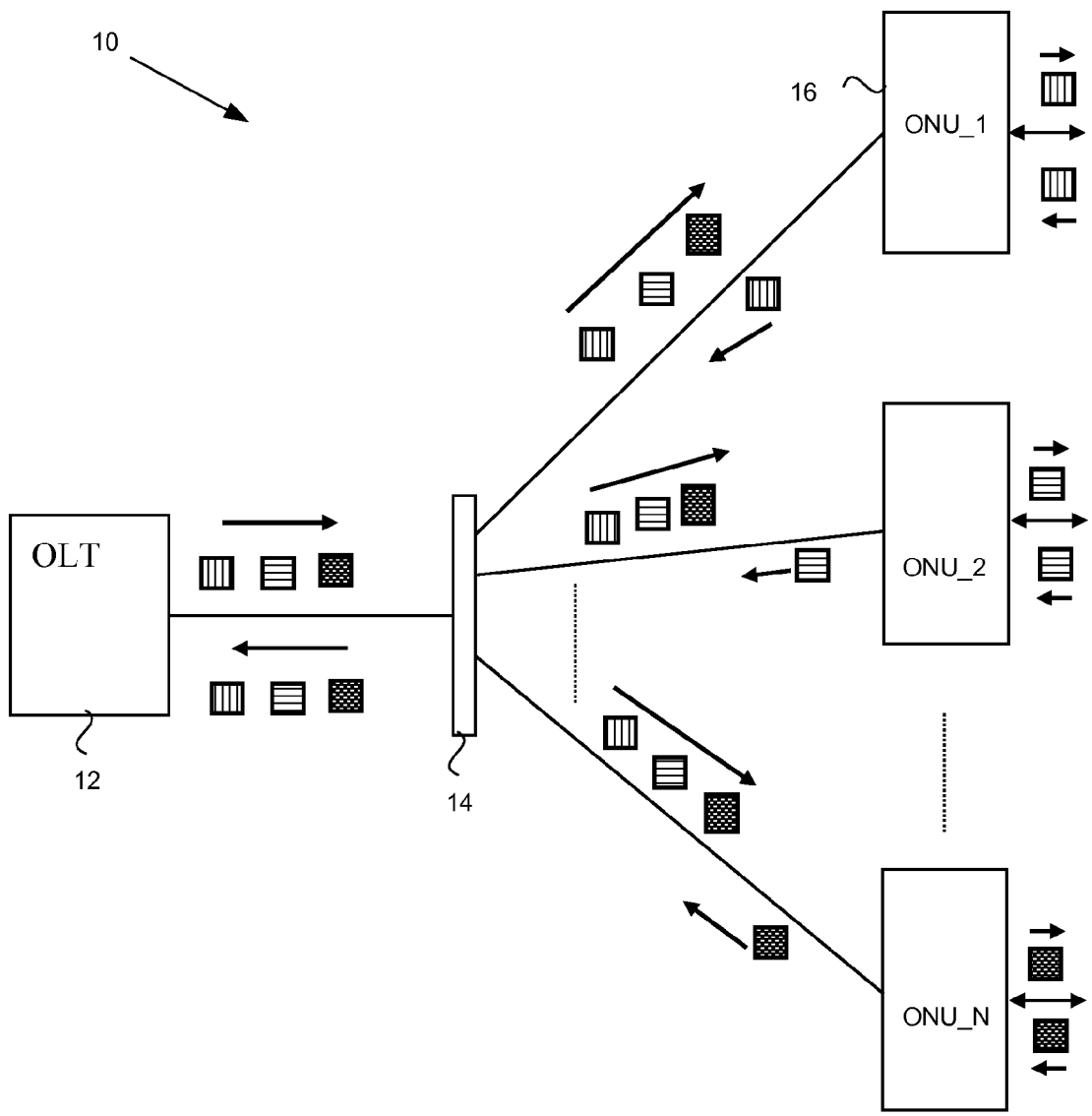
FIG. 1 illustrates a passive optical network.

In FIG. 1, there is shown a passive optical network 10 in which an optical line termination (OLT) device 12 communicates through an optical distribution network (ODN) with a plurality of optical network units (ONUs) 16 via an optical splitter 14. The optical splitter 14 can be a cascaded splitter which can also cause a difference in power.

Figure 2:
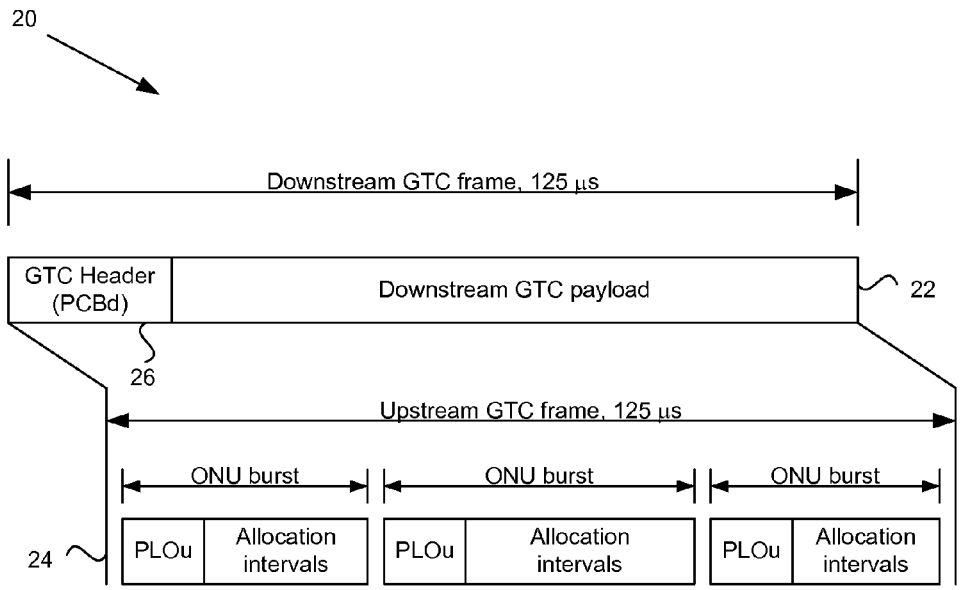
FIG. 2 illustrates downstream frames;
F*i*G. 3 illustrates downstream frames with forward error correction coding.

In the downstream direction (from the OLT to the ONUs), the OLT 12 sends a continuous stream of packets at high speed, e.g., at 1 Gb/s, 2.5 Gb/s or at 10 Gb/s (currently under development). The downstream contains both control information and data packets for the individual ONUs 16. An example is provided by G-PON reference diagram 20 illustrated in FIG. 2 which shows a stream of downstream 22 and upstream 24 frames. Here, the OLT 12 broadcasts the frames to every ONU 16. The Physical Control Block downstream (PCBd) 26 is received by every ONU, and the ONUs then act upon the relevant information contained in the PCBd 26, in particular the bandwidth map that specifies the burst allocation for upstream communication to the OLT for each ONU. The FEC used should be suitable for the worst OLT-ONU link (unless a disaster scenario occurs where a downstream burst frame format to an ONU is used that is unable to obtain the PCBd). The burst is preferably placed in a GTC frame such that it fits completely, and is preferably self-contained, i.e., it should have a sufficiently long delimiter, and potentially a preamble, such that it can be detected and parsed independently. All relevant information for the ONU, as well as relevant parts contained in PLUd, are part of the payload of this burst frame. In other examples, the downstream frames typically contain a synchronization word (to determine the frame boundaries), fields to convey physical layer operations and management information, and a variable length field with the bandwidth map.

Figure 3:
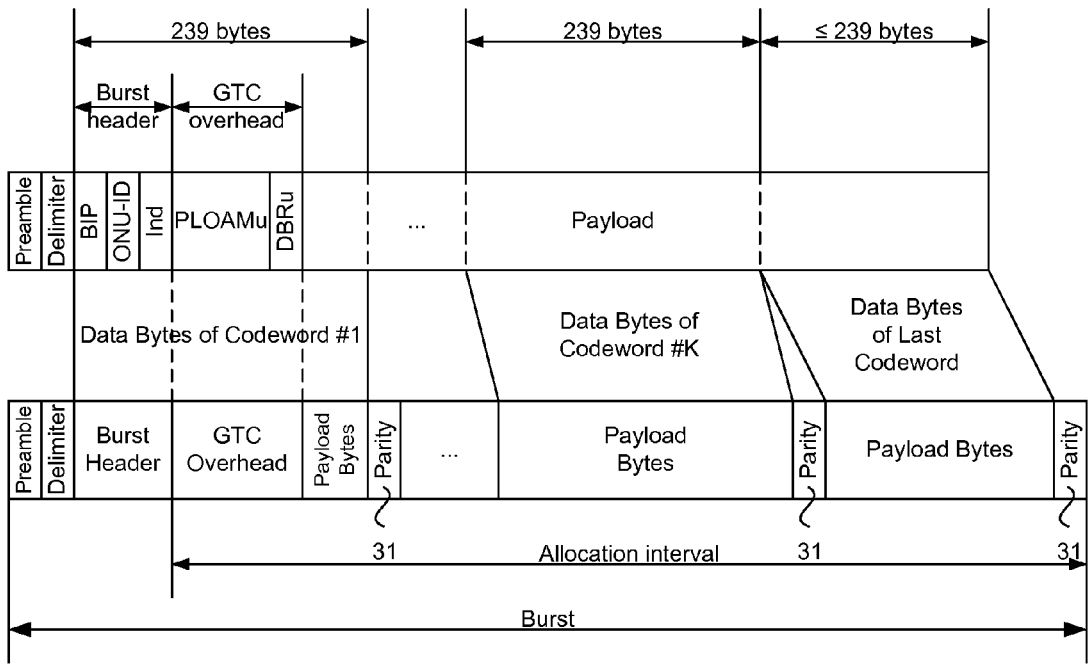

An example of FEC may be based on a Reed Solomon (RS) code consisting of n symbols (of m bits each), out of which k symbols are information-carrying symbols; the remaining (n−k) symbols are parity symbols. Such a code, commonly referred to as an (n,k) RS code, can correct up to (n−k)/2 (random) symbol errors. The maximum length for a given symbol size m (bits) is $2^m-1$. Note that the maximum length for extended RS codes is 1-2 bytes longer. In particular, the (255,239) RS code that is capable of correcting up to 8 symbols (bytes) is currently utilized to protect the downstream against transmission errors. If this code is used, the downstream burst transmission of the frames is interspersed with inserted FEC parity bytes 31 as shown in FIG. 3. The fields depicted in FIG. 3, as well as other similar figures, serve only as an example, and inherent error control and fields with repeated data may be modified, shortened and/or removed in future PON systems. The fields thus created can then be used for FEC, e.g., by one of the proposed (shortened, stronger) FEC codes. Other RS codes, such as a (255,223) RS code has been proposed for optical networks under consideration.

Other FEC codes, e.g., Bose Chaudhuri Hocquenghem (BCH) codes, can be used, which are bit-oriented, systematic, algebraic codes (whereby an erasure aspect described below does not work, but truncation of the payload does), and low-density parity check codes (where the rate can be changed by puncturing (not sending) preselected groups of parity bits. Other options are product codes (e.g., RS×RS or RS×BCH or BCH×BCH).

Figure 4:
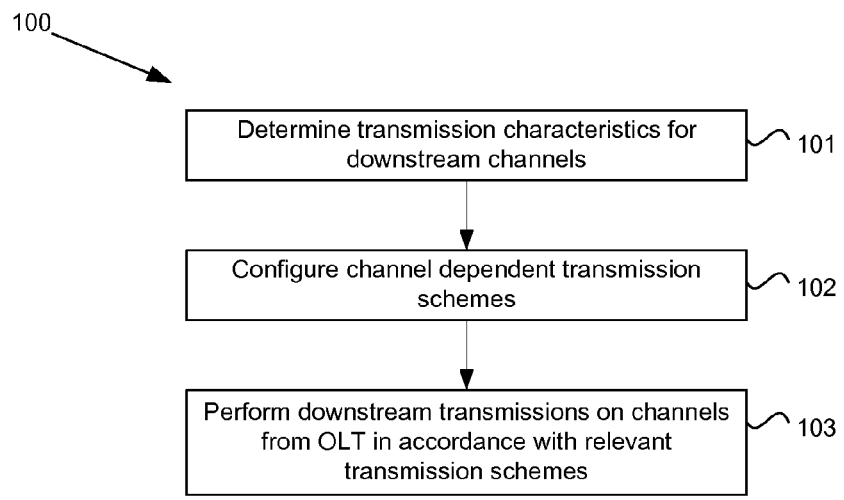
FIG. 4 illustrates a method for performing downstream communications.

As described above, there can be issues with providing adequate protection and error correction of downstream transmissions due to variations in the SNR of the various OLT-ONU channels. A method for performing downstream transmissions that can at least reduce these issues is illustrated in the flowchart 100 of FIG. 4. At step 101, the downstream transmission characteristics are determined for the various OLT-ONU channels. Using the downstream transmission characteristics, channel dependent transmission schemes can be configured for the channels (step 102). Downstream transmissions from the OLT to the ONUs can then be performed using the channel dependent transmission schemes for the respective channels (step 103). In another embodiment, a "monitor input BER and related statistic" block can be provided in FIG. 4 and, if threshold(s) are exceeded, FEC parameters can be adjusted. As such, the quality is monitored and actions are taken if the channel changes. Further, sync errors can be traced in order to adjust delimiter length, etc.

In one embodiment, a transmission scheme may incorporate an appropriate level of FEC for each one of the OLT-ONU downstream links. By this method, FEC overheads are effectively used only for those channels that need FEC. For ONUs having a very bad channel, a channel-dependent transmission scheme may include a burst-mode like transmission with appropriately strong FEC and sync mechanisms within the downstream transmissions. In addition, transmission schemes may use (hybrid) ARQ with Chase-like decoding as will be described in greater detail below.

Thus, a method in accordance with an embodiment of the disclosure determines the characteristics of the links from the OLT to the individual ONUs and uses an FEC code that enables each ONU to extract its own information and correct received data to the required BERo of that ONU.

Figure 5:
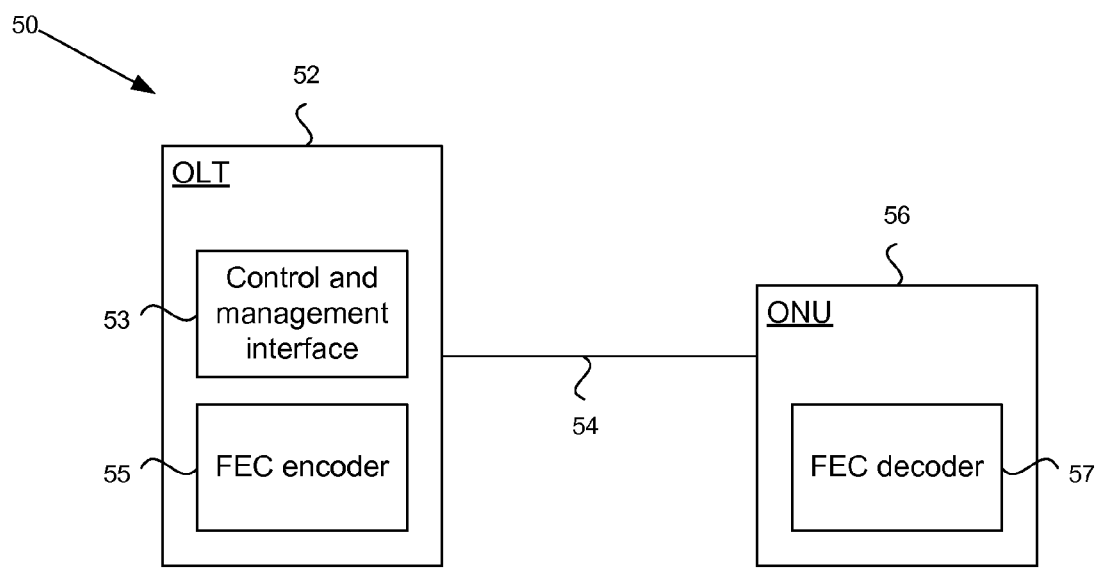
FIG. 5 illustrates a modified OLT-ONT link.

The method may be embodied in a passive optical network 50 shown in FIG. 5. The PON 50 may include an OLT 52 and a plurality of ONUs 56, though only one ONU 56 is shown. The OLT 52 communicates with the ONUs 56 through suitable optical channels 54. As shown in FIG. 5, the OLT may include a control and management interface 53 that is configured to determine downstream transmission characteristics of the channels 54. For example, the control and management interface 53 may be configured to determine one or more of the signal power level per channel, the SNR, BERi or any other suitable downstream transmission parameter. The OLT 52 is configured with an FEC encoder 55 for providing a forward error correction code into upstream transmission frames. Correspondingly, the ONT(s) 56 may be configured with a FEC decoder 57. The FEC encoder 55 may be configurable by the control and management interface 53. Components of the OLT 52 and ONU 56 that are not critical for highlighting the features of the present disclosure, such as the clock data recovery (CDR) block, a frame sync/delimiter detection block, etc., have been omitted for clarity. Further details of such components are available in the standards referenced above. In another embodiment, a "monitor input BER and related statistic" block can be provided in FIG. 4 and, if threshold(s) are exceeded, FEC parameters can be adjusted. As such, the quality is monitored and actions are taken if the channel changes. Further, sync errors can be traced in order to adjust delimiter length, etc. Though channel characteristics do not very much over time, the BER can be monitored, either periodically or continuously, and updates made to the FEC scheme if necessary to either increase the strength of the FEC, thereby reducing the error rate, or decreasing the FEC thereby allowing a higher transmission rate.

One option for determining the downstream channel transmission characteristics is to measure the SNR when the system is installed. In an alternative embodiment, the system may be started with a high level of FEC (and subsequent lower rate) which allows the FEC decoder in the ONU to count the number of errors that occurred in the frames. If the FEC code is strong, it ensures that all errors are corrected, and thus it is easy to count them. In performing the error count, the ONU may be configured to use packets that are not intended for that ONU to do the error statistics, unless the channel is so bad that many of these packets cannot be corrected, in which case the ONU has to stick to its own packets and others with similar channel conditions. If for example for one OLT-ONU link 15 errors are counted after $10^6$ bits, the BERi is likely to be around $1.5 \times 10^{-5}$. Because of the high transmission rates, the necessary statistics are likely to be obtained in a short time frame.

In one embodiment, a measure of the downstream transmission characteristics includes the variance of consecutive measurements. If this is in line with expectations, then the effective BERi can be considered to be known, as well as possibly some other statistics, and an appropriate FEC can be chosen accordingly. The other statistics may include the number of corrected frames, the number of uncorrectable frames, as well as the number of errors in some other fields. These numbers should match a predefined model to a large extent. For example, consecutive errors (burst errors) are not typically expected, but if they do occur, they will lead to a higher frame error rate than would typically be expected. A Reed Solomon code is fairly resilient, but even in such cases, a stronger RS code should be used to keep the BERo. In such situations, byte-wise interleaving of FEC codes is another option to consider.

The downstream characteristics can be recorded in the ONU and reported back to the OLT, and/or the OLT can request a measurement. Once the downstream characteristics are known, the OLT can select appropriate FEC parameters for future transmissions on a channel and communicate the chosen FEC parameters to the ONU on that channel, for example in PLOAM-like commands, or a similar control message. Protocols for requesting and/or reporting the downstream transmission characteristics are considered to be within the skill of a person skilled in the art and thus no further discussion of the reporting mechanisms are considered to be necessary here.

The characteristics of each OLT-ONU downstream link do not change very much over time, and therefore a control or management interface can be used to select the appropriate FEC code parameters for the individual links and use those parameters for subsequent downstream frames. For example, the PLOAM field may be used to convey control information. It is only a few bits, so control information and operations, administration and management (OAM) information is typically conveyed at a much lower speed. This is used to retrieve a parameter from the ONU, or to set a parameter.

In one embodiment, there is provided a channel-adaptive FEC scheme that preserves the currently used format but increases the number of operating points beyond two points. In this transmission scheme, an FEC code is used that has a configurable rate and, consequently, configurable error correction capabilities. In the following, let p denote the value of BERi for which the required BERo can be achieved. For the given BERi, a code can be determined that provides the required BERo. For instance, for a standard (n,k) RS code (with its corresponding encoder in the OLT and decoder in the ONU), the FEC capabilities can be increased by reducing the length of the information-carrying part, i.e., an $(n_1,k_1)$ code where $n_1-k_1=n-k$. The rate of an (n,k) RS code can also be increased by puncturing some symbols at known positions, e.g., the last b parity bytes. The punctured bytes are regarded as erasures. The punctured code can now correct up to (n-k-b)/2 symbol errors.

As an example, consider the use of an (n,k) RS code, and in particular an (255,223) RS code, as a base code and a BERo that is at most $10^{-12}$. The rate of this code is 0.8745 and $p \approx 8.3 \times 10^{-4}$. If the payload is shortened, e.g., to 100 bytes, with, as before, n−k=32 check bytes, the resulting effective code rate is equal to 0.7576. However, the error correcting capabilities are now better than required ($p \approx 1.6 \times 10^{-3}$). The other way around, by puncturing the last 8 bytes of a (255, 223) code, the rate can be increased at the expense of error correction capabilities.

In one embodiment, an FEC encoder and decoder can be made to be configured and thus used to generate and decode a wide variety of derived FEC codes, such as a (255,239) code and a (255,223) code, the parameters of which are matched to the channel conditions, and as such, the overhead is minimized. In one embodiment, it may be necessary to maintain the same field size for the FEC scheme.

Slight adaptations to the RS encoder and RS decoder may allow it to encode and decode any (n,k) RS code, where $n-k \leq P$, for a given value of P, and $n \leq 2^m-1$, (or possibly one-two symbols larger for extended RS codes). For instance, for the (255,223) code, P=32 (up to 16 correctable errors). The encoder/decoder can, after slight modifications, also be used to handle RS codes with parameters (255,225), ... (255,239), ... (255,253), (255,254), i.e., with rates from approx 7/8 (approx. 15% overhead) to 254/255 (approx. 0.25% overhead). Payload truncation could give a code, e.g., (8,4) RS code (rate=1/2), or even (33,32) RS (rate 1/33). Some of the "extreme parameter settings" such as very high rates are mostly of interest for error detection and the low and extremely low rates are of interest for very really bad channels—the extremes, like the rate 1/33 code, are not that interesting, but codes with rates of 1/2 or 1/4 may be quite effective for the protection of the header or other important info, e.g., (64,32) RS code (rate 1/2, 16 symbol errors can be corrected). If this is used for upstream in the beginning of the (burst) frame where the BERi is high, e.g., starting off at $1 \times 10^{-2}$, and if the BERi in the second part of the frame becomes very low, e.g., $1 \times 10^{-8}$, one can use one rate 1/2 code (e.g. (64,32) RS code, followed by (255,245) RS (5-error correcting). That way, the overall amount of overhead can be lower than if a uniform (255,223) RS code was used, and the "effective" protection is obviously much better. One could also think of several stages where the code rates of the RS codes increase gradually. In terms of measurement, an additional parameter for such a scheme would be to determine how many errors there are in the (correctly) decoded first, second, third RS codeword. That way, one can trace the decrease in BERi when more bits of the frame are received. For the RS codes to be flexible, they should preferably have the same Galois field, e.g., $GF(2^8)$, corresponding to 8-bit symbols (bytes). This is also why there is a maximum word-length (typically $2^8-1$ (extension by 1-2 bytes may be possible, so called extended RS codes). The number of bits per symbol (m), is not necessarily 8, of course, but for hardware to be shared, it is best to have the same m.

In the channel-adaptive FEC scheme, the error resilient methods, including FEC, target the entire downstream. In an alternative embodiment, transmission schemes for the OLT include scheduling the downstream such that the frames intended for the active ONUs that have similar link conditions are grouped. In this embodiment, the same FEC setting can be used for a group. As such, the grouped transmission scheme does not suffer from rate loss due to protection of fractional segments in variable length frames. The appropriate level of protection is selected for each group. Across groups, the stronger FEC may be used for the remainder of the packet of the previous group (that required less FEC), or a fractional FEC may be applied to each group.

The FEC scheme can be embedded in the underlying (GEM) frames and, depending on the required quality of service (QoS), sent across GTC frames to reduce losses due to fractioning of variable length frames. Depending on the channel quality, the information currently in the PCBd block that is relevant for a particular ONU is protected and/or partially replicated at predetermined positions in the GEM frames.

One option is to start up an OLT and joining ONUs with the same and relative strong FEC parameters, and to adjust these for the individual OLT-ONU links (upstream, downstream) over time. A control channel or OAM channel can be used to convey the new parameters. The update process could be aided by using the frame counter. The control/OAM message specifies at which frame counter the new FEC setting becomes active, and it may choose this far enough in the future that one can assure that an acknowledgement is received well before the transition to the new parameters (until then, the old FEC setting is used). As an option, the updates of the parameters can be broadcast to all ONUs, such that they know from each other what the parameters are. If an ONU was inactive, it starts in the strong FEC mode and adjusts after measurements of the error rates have been made. Optionally, previously used values can be stored also (after all, the channel conditions typically do not change). If, for whatever reason, the channel conditions (suddenly) become worse, the FEC settings can be changed to obtain a stronger FEC. In one scenario, where there are heavy disturbances for all channels, they may all decide to go back to strong FEC. In any case, the FECs can effectively measure the BER and protect the channels adaptively. Other parameters, e.g., preamble length for upstream, delimiter length, delimiter sequence specification, header protection scheme, can be communicated in a similar fashion as for the FEC parameters.

For the downstream, a compact downstream map can be used that, similar to the bandwidth map, identifies which traffic is intended for which ONU and where these packets are located in the GTC frame. If the FEC parameter settings for a particular ONU have been set, packet synchronization can be maintained. If the ONUs know of each other what their FEC settings are, one can also allow the tail of one packet for one ONU (A) and the head of the packet for a next ONU (B) in one FEC codeword; the FEC code used would for this packet be the stronger of the two (max overhead FEC (A), FEC (B). From a multicast perspective, the strongest FEC of the ONUs involved in the multicast is used. Also, especially for 10 G where the 125 microsecond frames contain many more bytes, it could be of interest to repeat a downstream map at repeated, predefined positions. That way, one does not need to know much ahead of time how big the packets to the individual ONUs are and how the scheduling is set. In a power saving mode, each ONU would skip the packets between the downstream maps, if it does not contain any packets for this ONU. One would also use a (relatively strong) FEC code to decode the maps (such that the probability of losing packet-level sync is low).

For ONUs that have an exceptionally bad reception, the OLT transmission scheme can embed a "burst-like frame" in the downstream that has additional fields for synchronization, control and FEC, such that the detection and correction capabilities are in line with the channel conditions. For such (bad) channels, schemes that retain received but uncorrectable blocks such as (hybrid) ARQ-like techniques can be used to decode information after the reception of subsequent frames. For example, if the SNR is very low, the packet error rate for a given OLT-ONU may become very low. The standard procedure is to discard the packet and request a retransmission. However, if the ONU can store the (erroneous) packet, it can either request the packet to be sent again or it can ask for more parity checks (that were computed but not sent). In the first case, the decoder combines the (erroneous) packets to see where they differ, and use for instance Chase decoding, which is a known method for combining erroneous packets and correcting them. In the case of transmission of extra parity check symbols, which is shorter than resending the packets, the decoder reassembles the (now longer) FEC code with more overhead and tries to decode this (stronger) code.

In one embodiment, the burst-like frame may have a similar composition to a GTC frame, but with a longer sync field(s) to allow the ONU with the bad channel to detect its part, and then a well protected control message section and payload. As a further enhancement, a transmission scheme using burst-like frames could put a preamble before the sync sequence as is typical in upstream bursts.

The above described embodiments may provide additional advantages for the implementation of sleep modes. For example, where the downstream transmission becomes "burst like", the ONUs detect and/or decode only part of the information and skip/sleep otherwise. In extreme cases it may be necessary to reinforce synchronization techniques to quickly acquire alignment when needed.

Advantages of the above described embodiments include the ability to provide a selected BERo for downstream transmissions while reducing overhead for FEC and other error resilient mechanisms in a system where the SNR of the links between the OLT and the different ONUs differ significantly. The advantages can be significant (e.g., a close to 15% rate increase for deployments where a (255,22) RS code is used and the active OLT-ONU links are good), as well as the ability to deploy the system when several ONUs have bad channel conditions (e.g., are far away, have a low-quality detector or suffer other losses). Extra overhead in terms of FEC and sync will only be used selectively when communicating to these ONUs with the frames/segments for the other ONUs being protected according to their channel condition, i.e. for good channels, there will be hardly any additional overhead.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. An optical network unit for a passive optical network, the optical network unit configured to:
   receive one or more frames and control information from an optical line termination device;

apply a forward error correction code scheme to the one or more frames responsive to the control information received;

count the number of errors corrected by the forward error correction code scheme; and report the number of errors to the optical line termination device.

2. The optical network unit according to claim 1 configured to:

receive a control message from the optical line termination device;

configure a forward error correction code scheme in accordance with an instruction in the control message; and apply the configured forward error correction code scheme to one or more frames subsequently received from the optical line termination device.

3. The optical network unit according to claim 2 configured to enter a sleep mode if the one or more frames subsequently received from the optical line termination device cannot be decoded.

* * * * *